United States Patent
Hiraiwa et al.

(10) Patent No.: US 10,272,866 B2
(45) Date of Patent: Apr. 30, 2019

(54) SIDE AIRBAG APPARATUS

(71) Applicant: TOYODA GOSEI CO., LTD., Kiyosu-shi, Aichi-ken (JP)

(72) Inventors: Takuya Hiraiwa, Kiyosu (JP); Takashi Iida, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 44 days.

(21) Appl. No.: 15/622,390

(22) Filed: Jun. 14, 2017

(65) Prior Publication Data

US 2017/0369020 A1    Dec. 28, 2017

(30) Foreign Application Priority Data

Jun. 24, 2016  (JP) ................. 2016-125462

(51) Int. Cl.
*B60R 21/00* (2006.01)
*B60R 21/207* (2006.01)
(Continued)

(52) U.S. Cl.
CPC ........ *B60R 21/207* (2013.01); *B60R 21/2334* (2013.01); *B60R 21/2338* (2013.01);
(Continued)

(58) Field of Classification Search
CPC ............ B60R 21/207; B60R 21/23138; B60R 21/233; B60R 21/2334; B60R 21/2338;
(Continued)

(56) References Cited

U.S. PATENT DOCUMENTS 7,681,907 B2 * 3/2010 Svenbrant ............. B60R 21/207
                                                   280/728.2
8,459,690 B2 * 6/2013 Breuninger ........... B60R 21/207
                                                   280/730.2
(Continued)

FOREIGN PATENT DOCUMENTS

JP    2009-23490 A    2/2009
JP    2009-23494 A    2/2009
(Continued)

OTHER PUBLICATIONS

Office action dated Apr. 3, 2018 issued in co-pending U.S. Appl. No. 15/375,268, and the Response thereto filed on Jun. 21, 2018.

*Primary Examiner* — Laura Freedman
(74) *Attorney, Agent, or Firm* — Posz Law Group, PLC

(57) ABSTRACT

A side airbag apparatus includes an inflator, an airbag having a main inflation portion and an auxiliary inflation portion, and a restriction portion. The main inflation portion is configured to be inflated by inflation gas supplied from the inflator and deployed forward in a space between a side wall of the vehicle and an occupant seated in a normal posture in a vehicle seat. The auxiliary inflation portion is configured to be inflated in a seat back by the inflation gas from the inflator, thereby pushing the occupant toward an inner side of the vehicle. The restriction portion restricts the auxiliary inflation portion from being inflated toward a gap that is between the rear end section in the outer side portion of the seat back and the rear end section in the middle portion of the seat back.

4 Claims, 11 Drawing Sheets

(51) Int. Cl.
  *B60R 21/231* (2011.01)
  *B60R 21/2334* (2011.01)
  *B60R 21/2338* (2011.01)

(52) U.S. Cl.
  CPC .............................. *B60R 21/23138* (2013.01); *B60R 2021/0006* (2013.01); *B60R 2021/0032* (2013.01); *B60R 2021/23107* (2013.01); *B60R 2021/23146* (2013.01); *B60R 2021/23382* (2013.01); *B60R 2021/23386* (2013.01)

(58) Field of Classification Search
  CPC .... B60R 2021/0006; B60R 2021/0032; B60R 2021/23146; B60R 2021/23107; B60R 2021/23386; B60R 2021/23382
  See application file for complete search history.

(56) References Cited

U.S. PATENT DOCUMENTS

| | | | | |
|---|---|---|---|---|
| 8,590,925 B2* | 11/2013 | Kwon | ................... | B60R 21/207 |
| | | | | 280/730.2 |
| 8,596,675 B2* | 12/2013 | Kwon | ................... | B60R 21/233 |
| | | | | 280/729 |
| 8,632,126 B2* | 1/2014 | Nitsuma | ............... | B60N 2/4228 |
| | | | | 297/216.13 |
| 8,702,123 B2* | 4/2014 | Mazanek | ............... | B60R 21/207 |
| | | | | 280/729 |
| 9,434,341 B2* | 9/2016 | Kaneko | ................. | B60R 21/207 |
| 9,862,345 B2* | 1/2018 | Ohno | .................... | B60R 21/207 |
| 9,932,011 B2* | 4/2018 | Hiraiwa | ................. | B60R 21/207 |
| 9,969,351 B2* | 5/2018 | Ohno | .................... | B60R 21/239 |
| 2009/0020988 A1 | 1/2009 | Sato et al. | | |
| 2010/0090448 A1* | 4/2010 | Pursche | ............... | B60R 21/0134 |
| | | | | 280/730.2 |
| 2012/0123645 A1* | 5/2012 | Kwon | ................... | B60N 2/4235 |
| | | | | 701/46 |
| 2017/0182963 A1* | 6/2017 | Hiraiwa | ................. | B60R 21/233 |
| 2018/0022308 A1* | 1/2018 | Kunisada | ............... | B60R 21/01 |
| | | | | 280/730.2 |
| 2018/0022309 A1* | 1/2018 | Kunisada | ............... | B60R 21/207 |
| | | | | 280/730.2 |
| 2018/0050651 A1* | 2/2018 | Fukawatase | .......... | B60R 21/207 |

FOREIGN PATENT DOCUMENTS

| | | | |
|---|---|---|---|
| JP | 2010076641 A | * | 4/2010 |
| JP | 2011-105126 A | | 6/2011 |
| JP | 2014080169 A | * | 5/2014 |

* cited by examiner

SIDE AIRBAG APPARATUS

BACKGROUND OF THE INVENTION

The present invention relates to a side airbag apparatus that protects an occupant seated in a vehicle seat from an impact by inflating an airbag outside and inside the vehicle seat when the impact is applied to the seat from a side, for example, due to a side collision.

Side airbag apparatuses are widely known as apparatuses that protect an occupant seated in a vehicle seat when an impact is applied to the seat from a side, for example, due to a side collision. A typical side airbag apparatus includes an inflator and an airbag, which is inflated with inflation gas supplied from the inflator. The inflator and the airbag are installed in the outer side of the seat back (backrest) of a vehicle seat.

One known form of the side airbag apparatus includes an airbag having a main inflation portion (a main airbag) and an auxiliary inflation portion (an auxiliary airbag) as disclosed in, for example, Japanese Laid-Open Patent Publication No. 2009-23494. The main inflation portion and the auxiliary inflation portion are accommodated in the outer side portion of the seat back. The words inside the parentheses following the names of the components are the names of the components used in Japanese Laid-Open Patent Publication No. 2009-23494.

The main inflation portion is inflated by inflation gas supplied from the inflator and projects from the seat back to be deployed forward between the occupant and the side wall of the vehicle. Prior to the deployment of the main inflation portion outside the seat back, the auxiliary inflation portion is inflated inside the seat back by inflation gas to push the occupant inward. The inflated auxiliary inflation portion pushes a part of the seat back that is forward of the auxiliary inflation portion, so that the part bulges diagonally forward and inward. The bulging part pushes the back of the occupant leaning against the seat back, thereby moving the occupant inward. This enlarges the space between the occupant and the side wall, thereby facilitating forward deployment and inflation of the main inflation portion.

If, for example, employed in a vehicle seat as disclosed in Japanese Laid-Open Patent Publication No. 2011-105126, the above-described airbag apparatus has the following drawbacks.

The vehicle seat disclosed in Japanese Laid-Open Patent Publication No. 2011-105126 includes a seat frame, which constitutes the framework of the seat back. The seat frame includes a pressure receiving plate (a plastic plate), which is arranged at the center in the vehicle width direction, and an outer frame portion, which is separated from and surrounds the pressure receiving plate. The pressure receiving plate is used to stably support the back of the occupant seated in the vehicle seat and is arranged at the rear end of the seat back. Part of the outer frame portion that is located in the outer side portion of the seat back is constituted by an outer side frame portion. The words inside the parentheses following the names of the components are the names of the components used in Japanese Laid-Open Patent Publication No. 2011-105126.

If the above-described airbag apparatus is employed in the vehicle seat of the publication, the airbag and the inflator, which form the main part of the side airbag apparatus, are installed in the outer side portion of the seat back. The auxiliary inflating portion is accommodated in part of the outer side portion of the seat back that is forward of the pressure receiving plate. When the inflator discharges inflation gas, the main inflation portion and the auxiliary inflation portion are respectively inflated. At this time, the auxiliary inflation portion is pushed from the front by the occupant and inflated rearward and may enter the gap between the outer side frame portion and the pressure receiving plate. This reduces the reaction force of the auxiliary inflation portion that acts to push the part of the seat back forward of the auxiliary inflation portion and cause the part to bulge inward and diagonally forward. As a result, the movement of the occupant inward and the enlargement of the space between the occupant and the side wall may be insufficient.

SUMMARY OF THE INVENTION

Accordingly, it is an objective of the present invention to provide a side airbag apparatus capable of inflating an auxiliary inflation portion to move an occupant inward of the vehicle in a favorable manner.

To achieve the foregoing objective and in accordance with one aspect of the present invention, a side airbag apparatus is provided that includes an inflator, an airbag, and a restriction portion. The inflator is arranged in an outer side portion of a seat back of a vehicle seat. The seat back includes a middle portion in a vehicle width direction, and the outer side portion is located on an outer side of the middle portion. The airbag includes a main inflation portion and an auxiliary inflation portion. The main inflation portion is stored in the outer side portion of the seat back. The main inflation portion is configured to be inflated by inflation gas supplied from the inflator, project from the seat back, and be deployed forward in a space between a side wall of the vehicle and an occupant seated in a normal posture in the vehicle seat. At least a main part of the auxiliary inflation portion is stored in the outer side portion of the seat back, and the auxiliary inflation portion is configured to be inflated in the seat back by the inflation gas from the inflator, thereby pushing the occupant toward an inner side of the vehicle prior to the deployment of the main inflation portion outside the seat back. The restriction portion restricts the auxiliary inflation portion from being inflated toward a gap that is between a rear end section in the outer side portion of the seat back and a rear end section in the middle portion of the seat back.

DETAILED DESCRIPTION OF THE PREFERRED EMBODIMENTS

A side airbag apparatus according to one embodiment of the present invention will now be described with reference to FIGS. 1 to 13.

In the following description, the direction in which the vehicle advances will be referred to as the front, and the reverse direction will be referred to as the rear. The center in the width direction of the vehicle (the vehicle width direction) is used as a reference. The side closer to the center in the vehicle width direction will be referred to as the inner side of the vehicle, while the side farther from the center in the vehicle width direction will be referred to as the outer side of the vehicle. It is now assumed that an occupant having a size equivalent to a crash test dummy is seated in a normal posture in the vehicle seat. The crash test dummy is, for example, the AM50 (the model that covers 50% of the American adult male population) of the WorldSID program.

Figure 1:
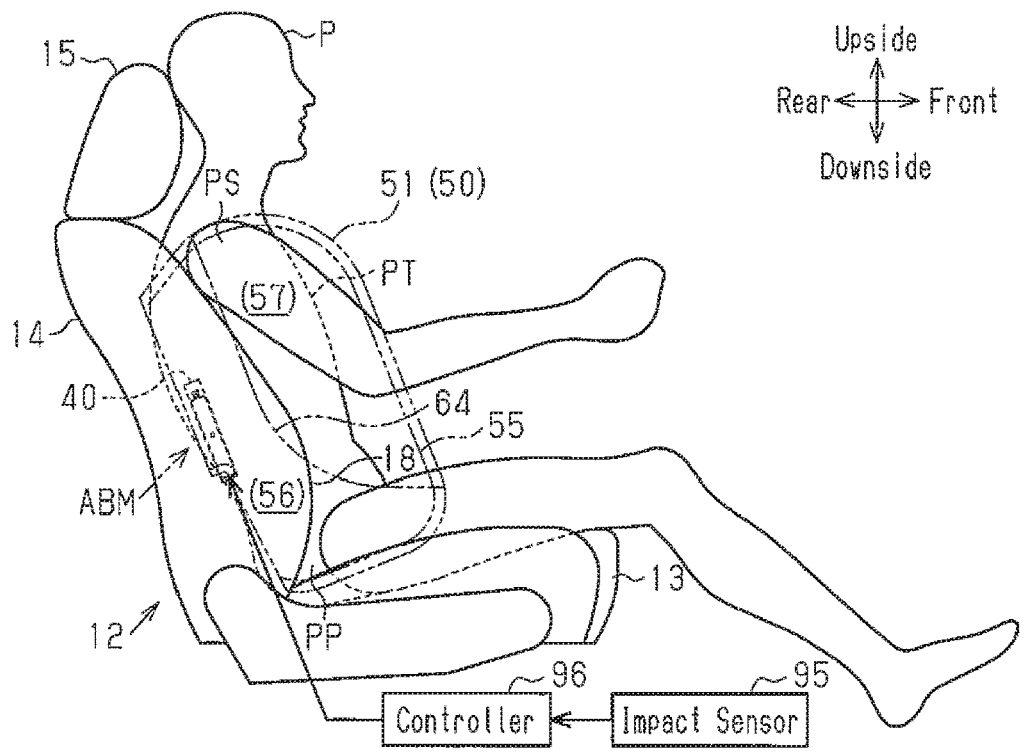
FIG. 1 is a side view of a side airbag apparatus according to one embodiment, illustrating, together with an occupant, the apparatus installed in a vehicle seat.
Figure 2:
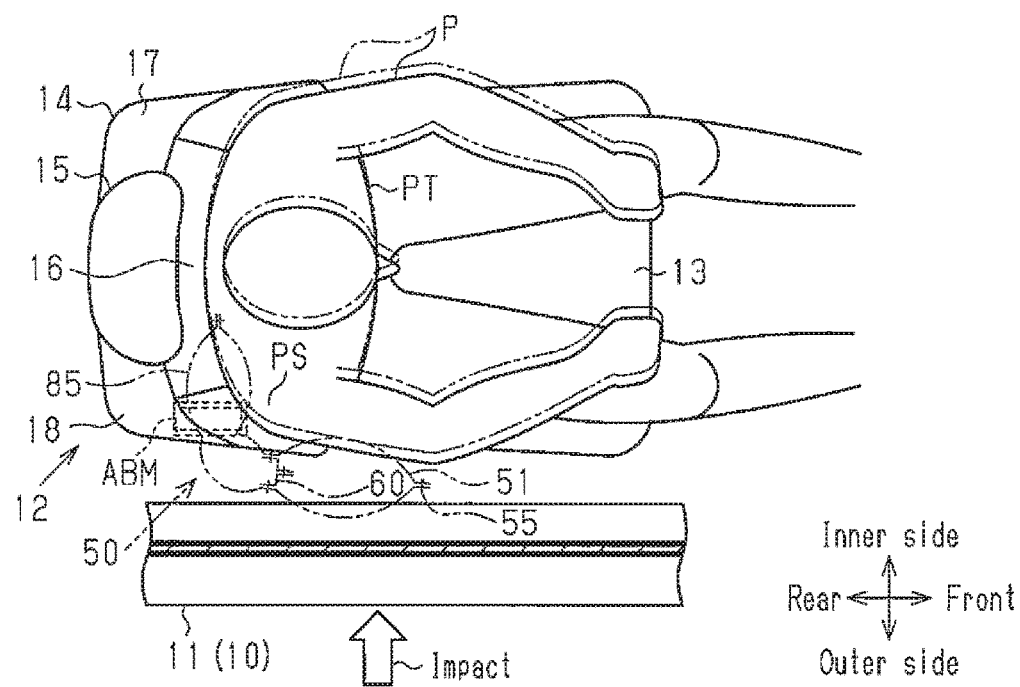
FIG. 2 is a plan view of the positional relationship of the vehicle seat, an airbag, the occupant, and a side wall portion according to the embodiment.

As shown in FIGS. 1 and 2, a vehicle seat 12 is arranged on the inner side of a side wall 11 of a vehicle 10. The side wall 11 refers to a vehicle component that is located in a side section of the vehicle 10, and mainly corresponds to a door and a pillar. For example, a part of the side wall 11 that corresponds to a front seat includes a front door and a center pillar (B-pillar). A part of the side wall 11 that corresponds to the rear seat includes a rear part of a side door (a rear door), a C-pillar, a front part of a wheel well, and a rear quarter.

The vehicle seat 12 includes a seat cushion 13, a seat back 14, which extends upward from the rear end of the seat cushion 13, and a headrest 15 attached to the top of the seat back 14. The tilt angle of the seat back 14 is adjustable. The vehicle seat 12 is arranged in the passenger compartment such that the seat back 14 faces forward. The width direction of the thus arranged vehicle seat 12 coincides with the direction of the vehicle width.

To distinguish sections in the vehicle width direction of the seat back 14, a middle part in the vehicle width direction is defined as a middle portion 16, and sections on the sides in the vehicle width direction are defined as side portions 17, 18.

Figure 3:
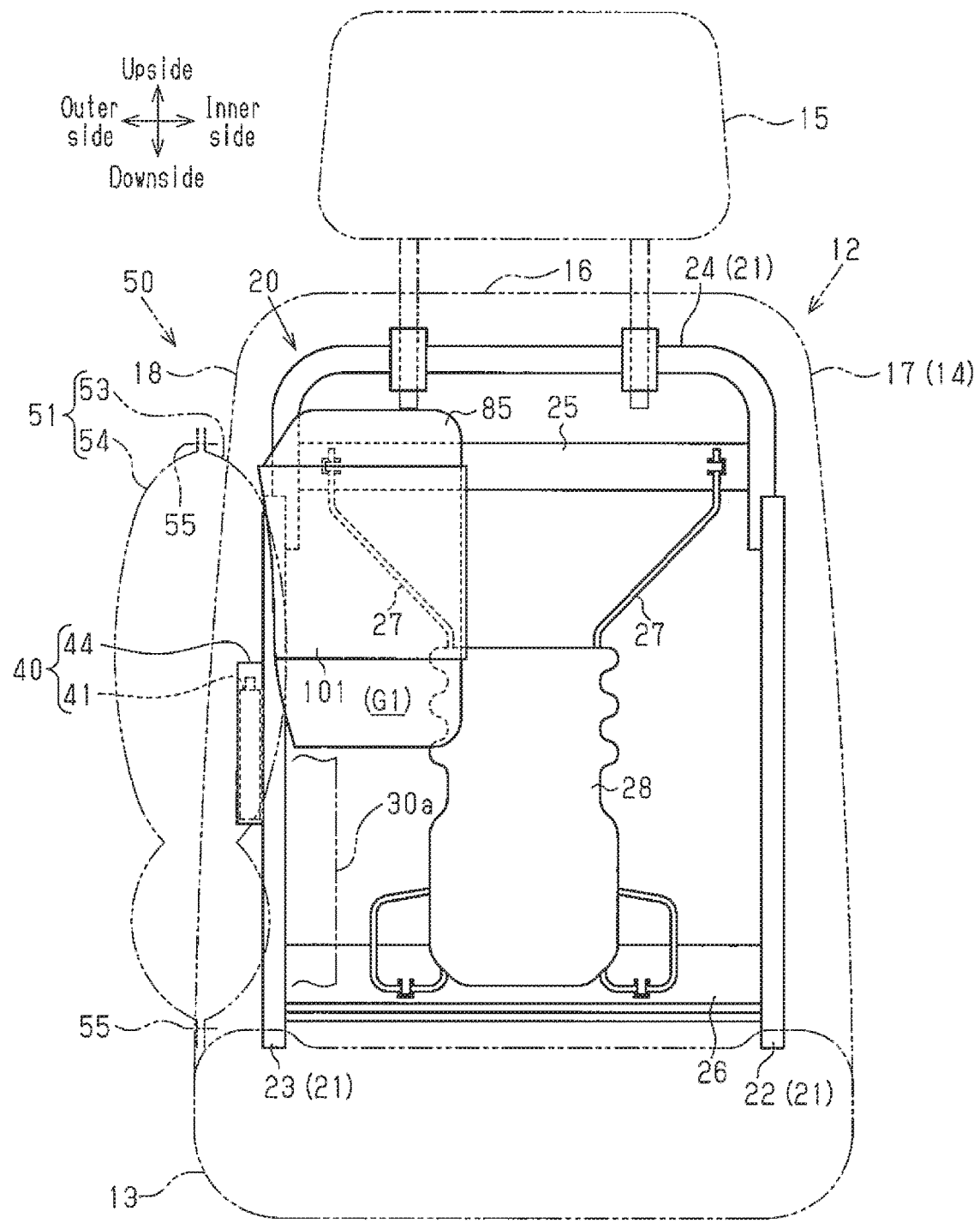
FIG. 3 is a front view of the seat frame according to the embodiment as viewed from the front side of the vehicle.
Figure 12:
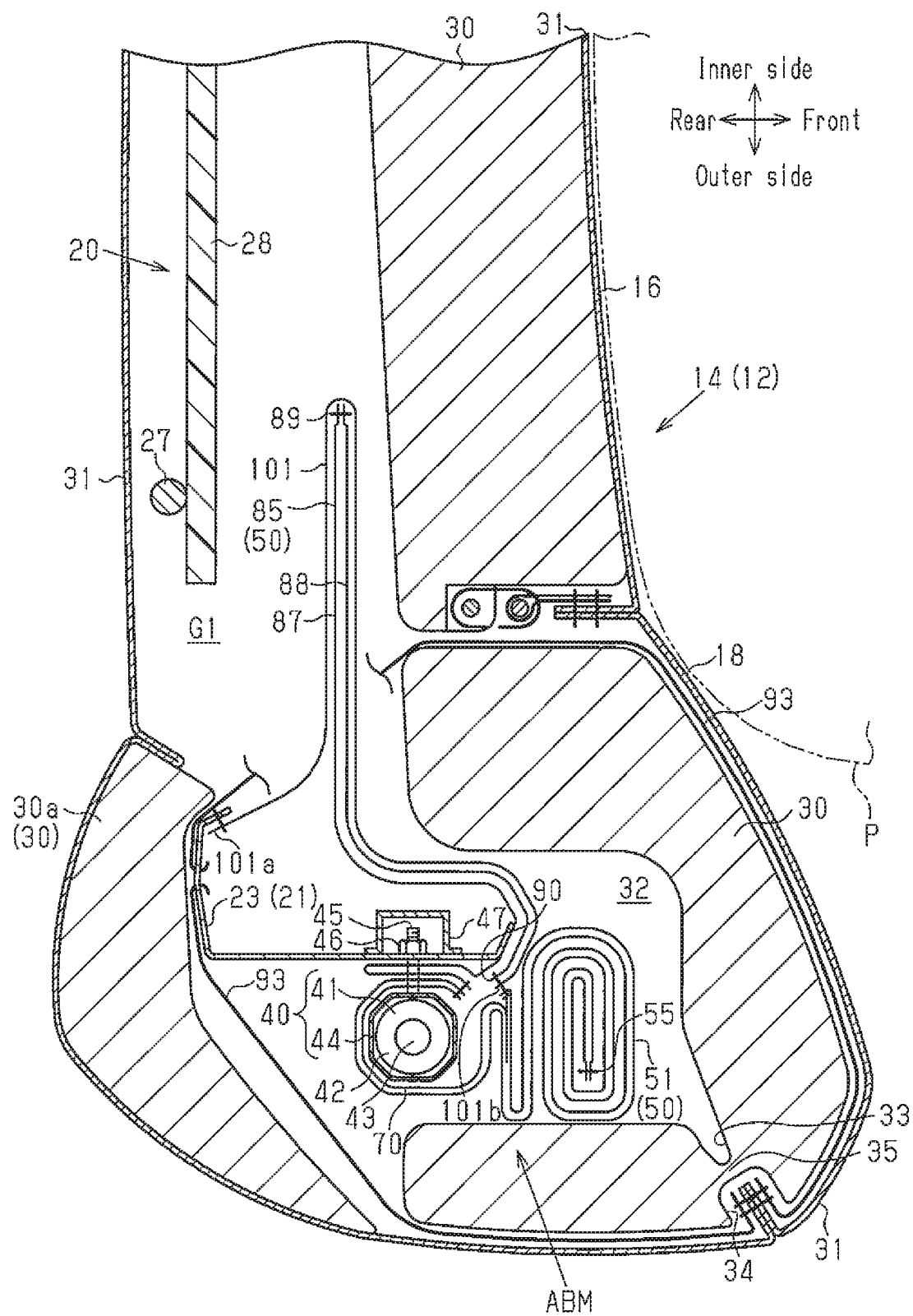
FIG. 12 is a partial cross-sectional plan view showing the internal structure of the seat back according to the embodiment.

As shown in FIGS. 3 and 12, the framework of the seat back 14 is constituted by a seat frame 20. The periphery of the seat frame 20 is constituted by an outer frame portion 21. The outer frame portion 21 includes a pair of side frame portions 22, 23 and an upper frame portion 24. Each side frame portion 22, 23 is formed by bending a metal plate into a shape extending vertically. The inner side frame portion 22 is arranged in the inner side portion 17. The outer side frame portion 23 is arranged in the outer side portion 18. The upper frame portion 24 is formed by bending a pipe into an inverted U. The opposite ends of the upper frame portion 24 face each other in the vehicle width direction. The opposite ends of the upper frame portion 24 are respectively fixed to the upper ends of the side frame portions 22, 23.

A plate-shaped upper auxiliary frame portion 25, which extends in the vehicle width direction, bridges the opposite ends of the upper frame portion 24. Also, a plate-shaped lower auxiliary frame portion 26, which extends in the vehicle width direction, bridges the lower sections of the side frame portions 22, 23. Rods 27, which are made of spring material, bridge the upper auxiliary frame portion 25 and the lower auxiliary frame portion 26. A pressure receiving plate 28 is attached to the rods 27 from the front side. The pressure receiving plate 28 is configured to support the back of an occupant P seated in the vehicle seat 12 in a stable manner.

As shown in FIG. 12, a seat pad 30 made of an elastic material such as urethane foam is arranged in the vicinity of the seat frame 20. Part of the seat pad 30 is located rearward of the outer side frame portion 23 and separated from and on the outer side of the pressure receiving plate 28. This part of the seat pad 30 will be referred to as a rear pad portion 30a to be distinguished from the remaining parts. The seat pad 30 is covered with a plurality of covering sheets 31. Adjacent covering sheets 31 are joined to each other through sewing.

A storage portion 32 is provided in the outer side portion 18 about the outer side frame portion 23. An airbag nodule ABM is installed in the storage portion 32. The airbag module ABM forms a main part of the side airbag apparatus.

The seat pad 30 includes a slit 33 that extends from a front outer corner of the storage portion 32. The seat pad 30 also includes a groove 34 at the front corner in the side portion 18. In the seat pad 30, the part between the slit 33 and the groove 34 serves as a thin breakable portion 35, which is broken by a main inflation portion 51 of an airbag 50. The airbag 50 will be discussed below.

The airbag module ABM includes as its main components a gas generator 40 and an airbag 50. Each of these components will now be described.

<Gas Generator 40>

Figure 8:
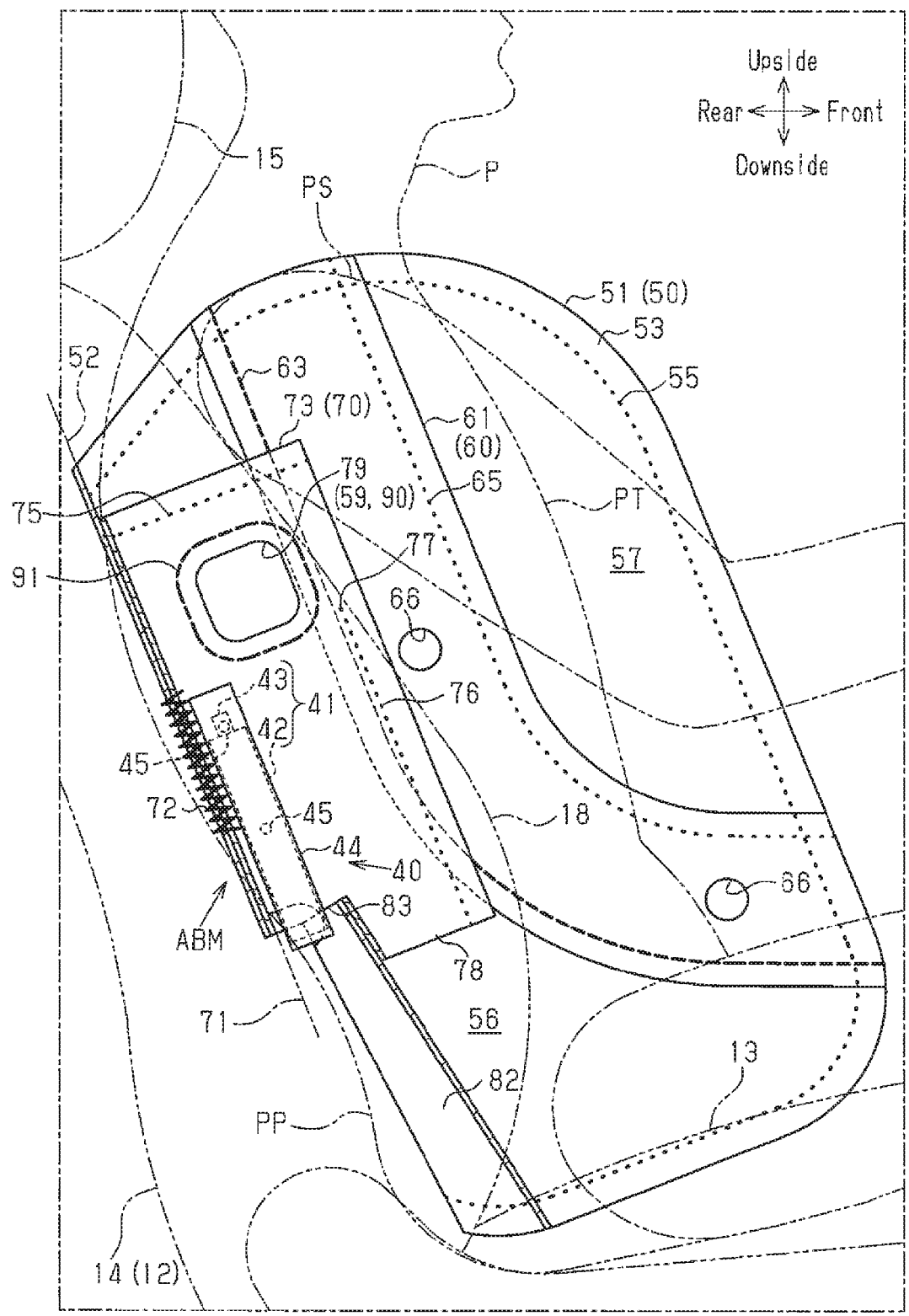
FIG. 8 is a cross-sectional side view illustrating, together with an occupant and a vehicle seat, the internal structure of the airbag module of FIG. 4.
Figure 9:
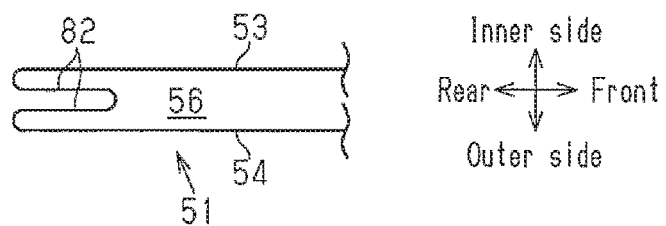
FIG. 9 is a cross-sectional view taken along line 9-9 in FIG. 4.

As shown in FIGS. 8 and 12, the gas generator 40 includes an inflator 41 and a retainer 44, which surrounds the inflator 41. In the present embodiment, a pyrotechnic type inflator is employed as the inflator 41. The inflator 41 includes an elongated main body 42 and a gas outlet 43 provided at one end (the upper end) of the main body 42. The gas outlet 43 has a columnar shape with a diameter smaller than that of the main body 42. The main body 42 stores a gas generating agent (not shown), which generates inflation gas. A harness (not shown) for delivering activation signals to the inflator 41 is connected to the other end (the lower end) of the main body 42. The gas outlet 43 discharges inflation gas generated in the main body 42 in the radially outward direction.

In place of the pyrotechnic type inflator 41 using a gas generating agent, it is possible to use a hybrid type inflator, which ejects inflation gas by breaking a partition of a high-pressure gas cylinder filled with high-pressure gas with low explosive.

The retainer 44 functions as a diffuser for controlling the direction of discharged inflation gas and also serves as a member for fastening the inflator 41, together with the airbag 50, to the outer side frame portion 23. Most of the retainer 44 is formed by bending a plate such as a metal plate into a substantially cylindrical shape. The retainer 44 has a window (not shown) at a position facing the gas outlet 43. Some of the inflation gas discharged from the gas outlet 43 is supplied to the outside of the retainer 44 through the window.

A pair of bolts 45 is fixed to the retainer 44. The bolts 45 serve as securing members for attaching the retainer 44 to the side frame portion 23. The gas generator 40 may be formed by integrating the inflator 41 and the retainer 44.

As shown in FIGS. 2 and 3, the main part of the airbag 50 is constituted by a main inflation portion 51 and an auxiliary inflation portion 85, which has a smaller volume than that of the main inflation portion 51. The main inflation portion 51 is inflated by inflation gas to project from the seat back 14 and is deployed forward between the side wall 11 and the occupant P in the normal posture, who is leaning against the seat back 14. In contrast, the auxiliary inflation portion 85 completes inflation prior to the inflation of the main inflation portion 51. Specifically, prior to the deployment of the main inflation portion 51 outside the seat back 14, the auxiliary inflation portion 85 is inflated by inflation gas at a positron forward of the pressure receiving plate 28 of the seat back 14 to push the upper body of the occupant P inward.

Figure 4:
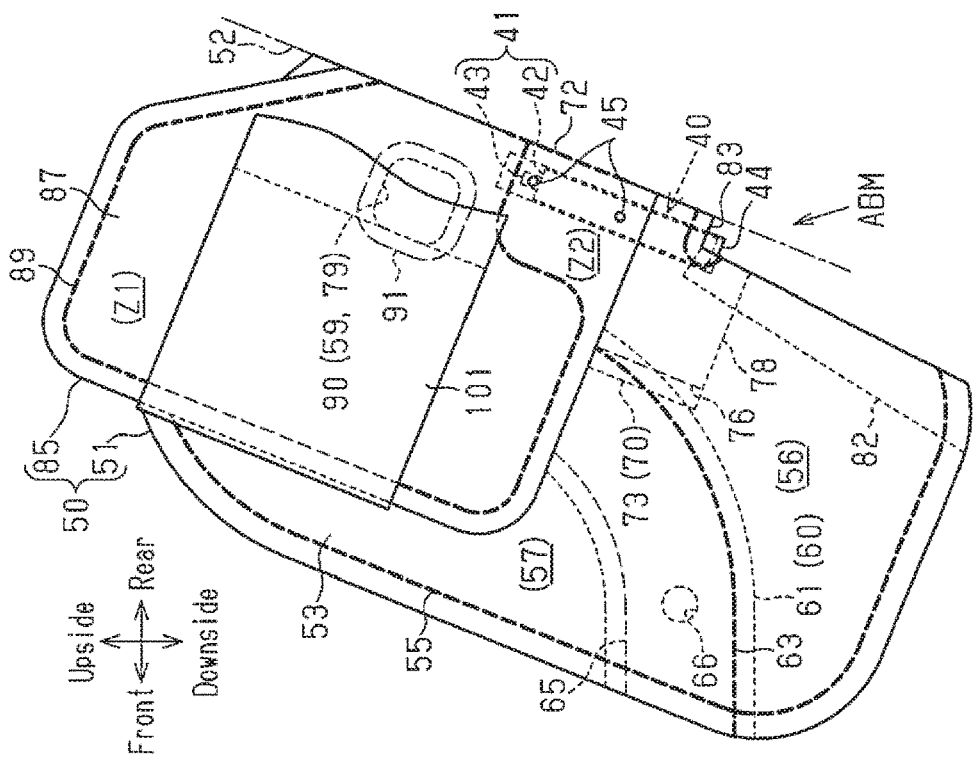
FIG. 4 is a side view illustrating the airbag module according to the embodiment, as viewed from the outer side of the vehicle, with the airbag in an uninflated-spread state.
Figure 5:
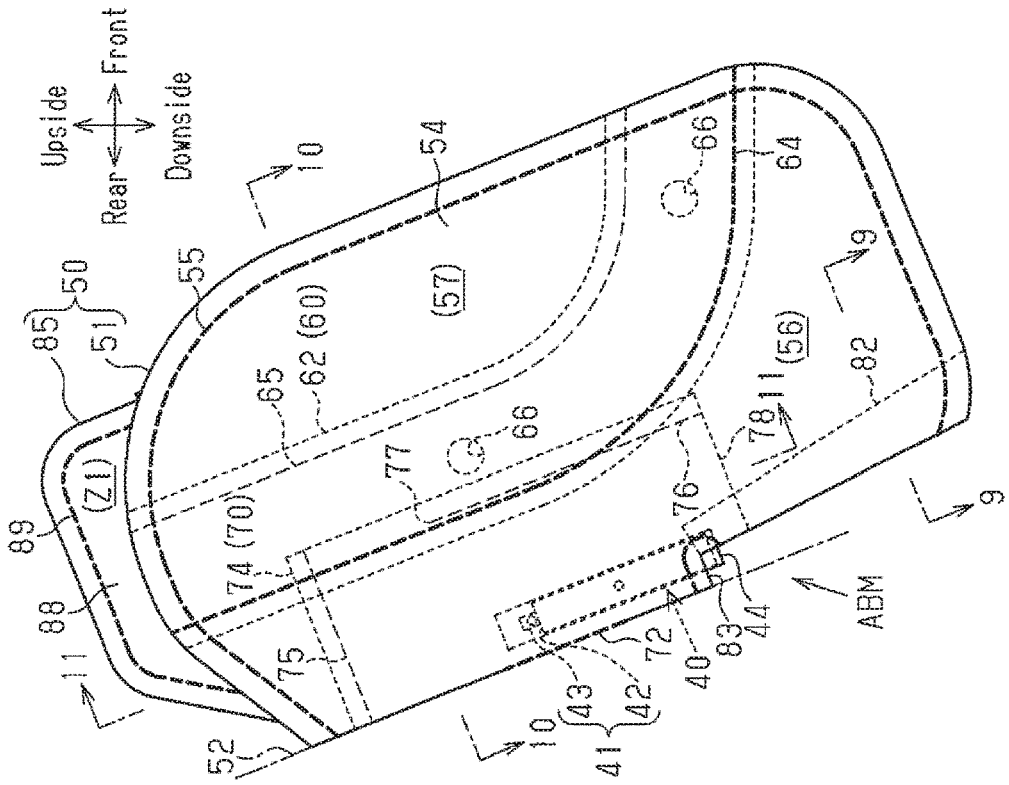
FIG. 5 is a partial side view illustrating the airbag module according to the embodiment, as viewed from the inner side of the vehicle, with the airbag in an uninflated-spread state.
Figure 6:
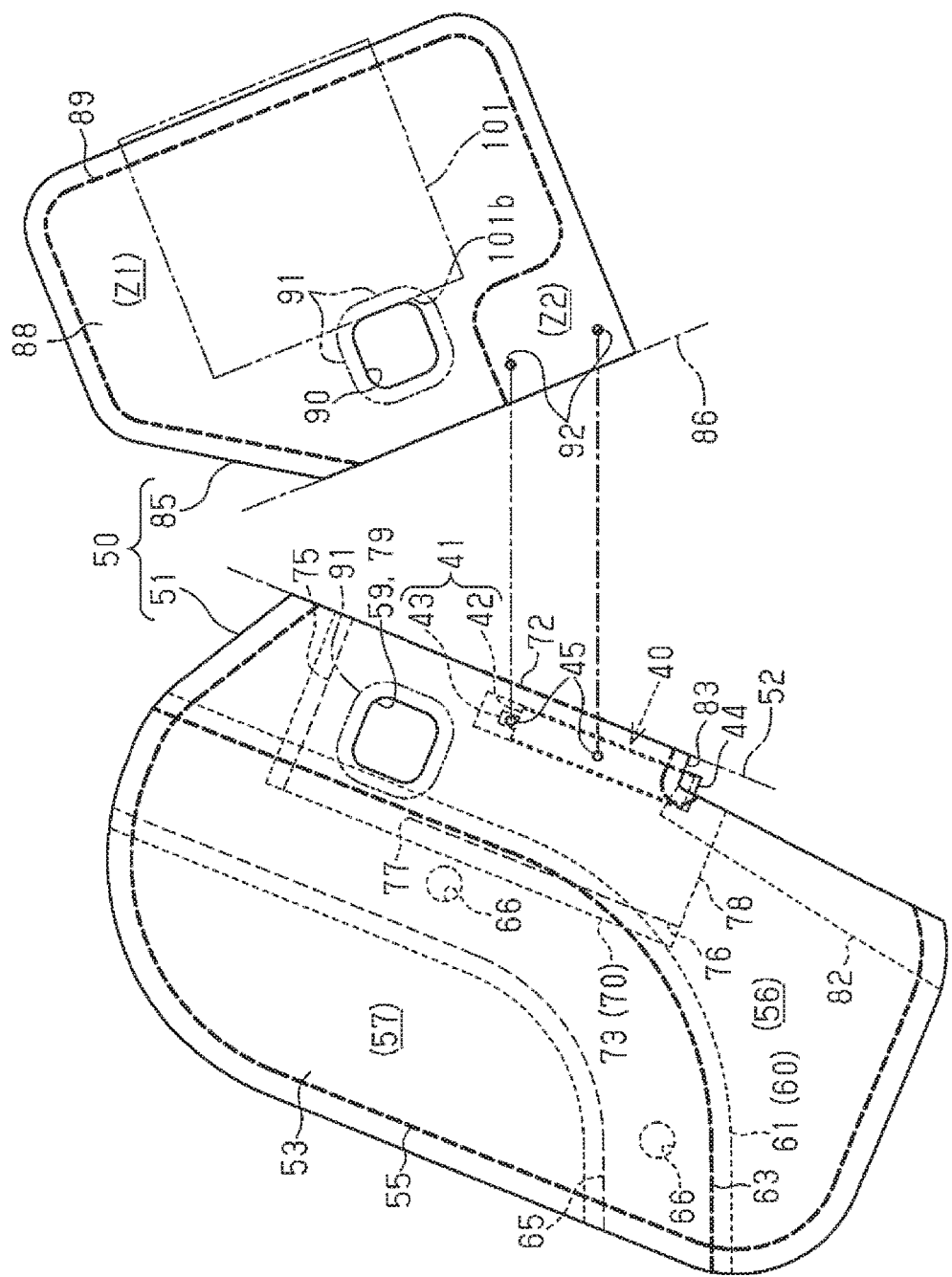
FIG. 6 is a side view illustrating the main inflation portion and the auxiliary inflation portion according to the embodiment in a separated state.
Figure 7:
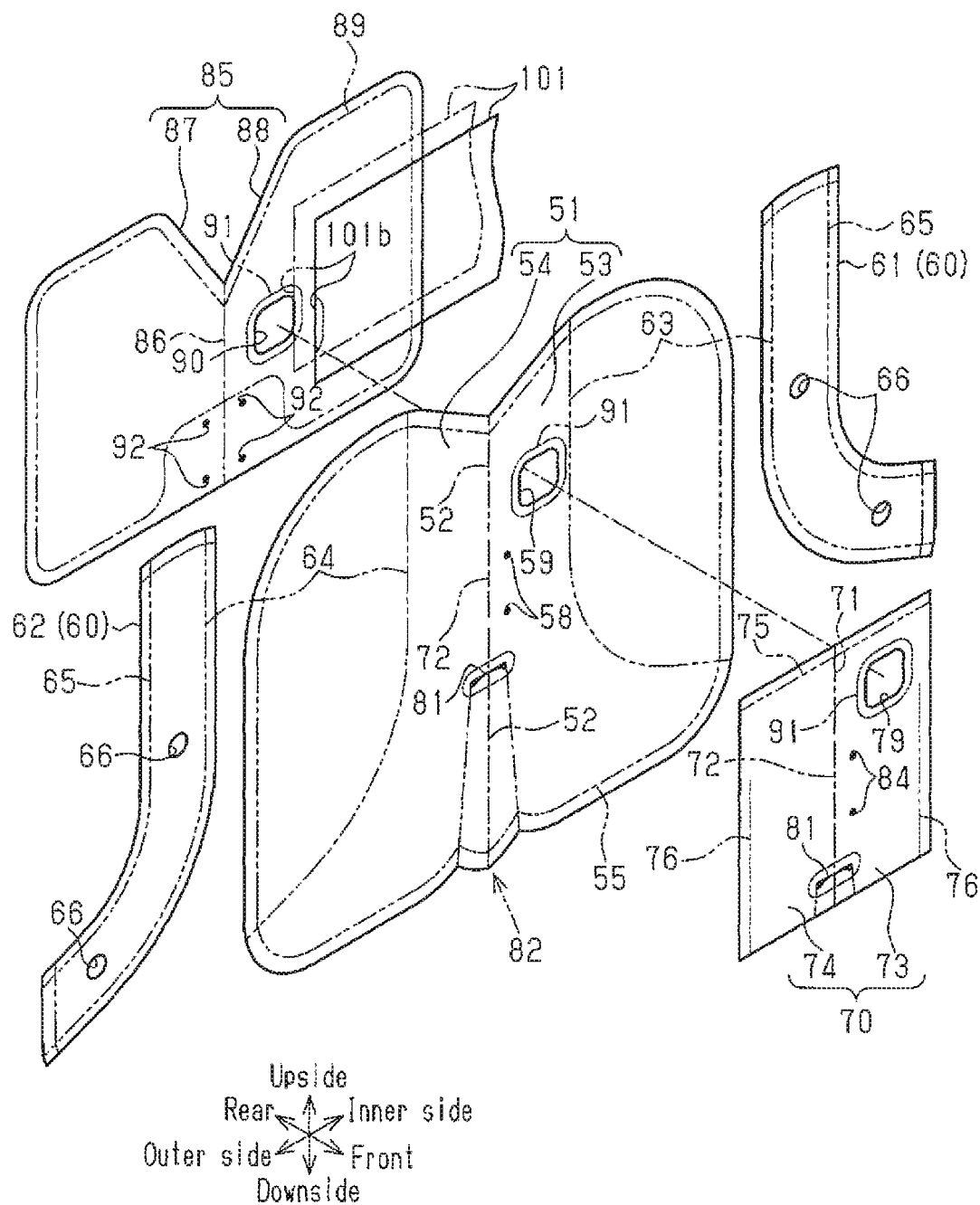
FIG. 7 is a partial exploded perspective view showing a spread state of the components of the airbag according to the embodiment.

FIGS. 4 to 6 show the main inflation portion 51 and the auxiliary inflation portion 85 in an uninflated-spread state, in which the inflation portions 51, 85 are flatly spread without being filled with inflation gas. FIG. 7 illustrates a spread state of the components of the airbag 50.

<Main Inflation Portion 51>

FIG. 8 illustrates, together with the vehicle seat 12 and the occupant P, the main inflation portion 51 divided at the center in the vehicle width direction. The auxiliary inflation portion 85 is not illustrated in FIG. 8.

As shown in FIGS. 4 and 6 to 8, the main inflation portion 51 is formed by folding a single fabric piece, which is also referred to as a base fabric sheet or a fabric panel, along a folding line 52 to be superposed in the vehicle width direction, and joining the superposed parts. To distinguish the two superposed parts of the main inflation portion 51, the part located on the inner side will be referred to as a fabric portion 53, and the part located on the outer side will be referred to as a fabric portion 54.

The shape and the size of the fabric portions 53, 54 are set such that the main inflation portion 51 occupies the region beside most part of the upper body of the occupant P, specifically, the region including the lumbar region PP and the shoulder region PS, when the main inflation portion 51 is deployed and inflated between the vehicle seat 12 and the side wall 11 (see FIG. 1).

In the present embodiment, the fabric piece is folded in half such that the folding line 52 is located at the rear end of the main inflation portion 51. However, the fabric piece may be folded in half such that the folding line 52 is located at another end such as the front end, the upper end, or the lower end of the main inflation portion 51. The main inflation portion 51 may also be formed of two fabric pieces divided along the folding line 52. Furthermore, the main inflation portion 51 may be formed of three or more fabric pieces.

The fabric portions 53, 54 are preferably formed of a material having high strength and flexibility to be easily folded. The material may be, for example, woven cloth formed of polyester threads or polyamide threads.

The fabric portions 53, 54 are joined to each other at a peripheral joint portion 55 provided along the peripheries. In the present embodiment, the peripheral joint portion 55 is formed by sewing parts of the peripheral portions of the fabric portions 53, 54 except for the rear end, specifically, the part in the vicinity of the folding line 52. Sewing is also performed on other joint portions, which will be discussed below. The joint portions include rear vertical joint portions 63, 64, a front vertical joint portion 65, a vertical joint portion 72, an upper lateral joint portion 75, a front vertical joint portion 76, a peripheral joint portion 89, and a loop-shaped joint portion 91.

The sewn portions are depicted by first to third different broken lines in FIGS. 4 to 6, 8, and 14. The first broken line includes thick line segments of a certain length arranged intermittently and represents sewing threads as viewed from the side (refer to the peripheral joint portion 55 in FIG. 4). The second broken line includes thin line segments of a certain length that is longer than those in a typical broken line arranged intermittently, and represents the state of sewing threads that are located, for example, behind a fabric piece and cannot be seen directly (refer to the front vertical joint portion 65 in FIG. 4). The third broken line includes dots arranged at predetermined intervals and represents the cross-section of the sewing threads on a plane along the sewn portions (refer to the peripheral joint portion 55 in FIG. 8).

The peripheral joint portion 55 may be formed by a method other than sewing using the sewing threads, but may be formed by, for example, using an adhesive. Such modification is applicable to any of the above-described joint portions.

A partition 60 and an inner tube 70 are provided in the main inflation portion 51. Of the partition 60 and the inner tube 70, the partition 60 has the same structure as a member generally referred to as a tether.

<Partition 60>

As shown in FIGS. 4 and 6 to 8, the partition 60 divides the main inflation portion 51 into two chambers arranged in the front-rear direction, that is, a rear inflation chamber 56 and a front inflation chamber 57. The partition 60 is formed by a pair of fabric portions 61, 62, which is made of the same material as that of the main inflation portion 51. The lower parts of the fabric portions 61, 62 are inclined such that the closer to the lower end, the closer to the front end. When the main inflation portion 51 is in an uninflated-spread state, the fabric portions 61, 62 are superposed on each other in the vehicle width direction. The upper ends of the fabric portions 61, 62 are joined to the upper ends of the fabric portions 53, 54 of the main inflation portion 51 by part of the peripheral joint portion 55. The front lower ends of the fabric portions 61, 62 of the partition 60 are joined to the front lower parts of the fabric portions 53, 54 of the main inflation portion 51 by part of the peripheral joint portion 55.

Figure 10:
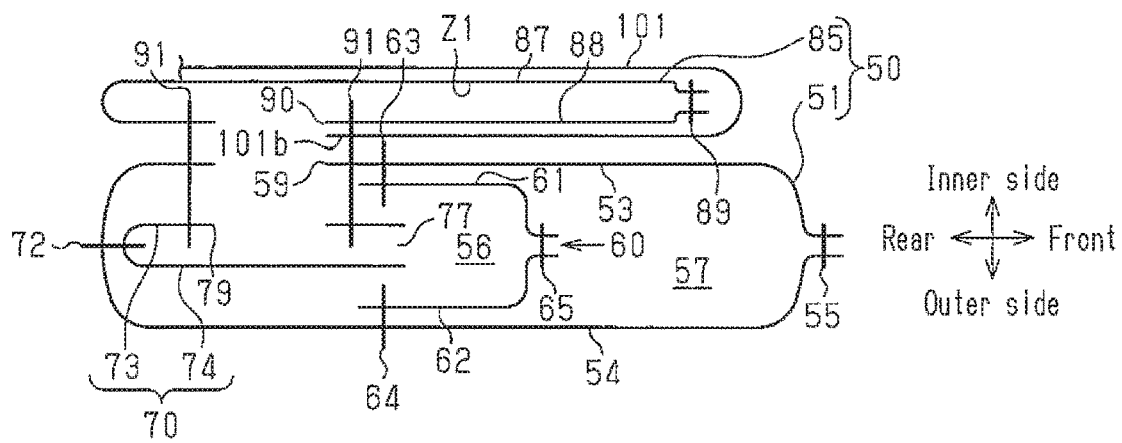
FIG. 10 is a cross-sectional view taken along line 10-10 of FIG. 4.

As shown in FIG. 10, the inner fabric portion 61 has a rear vertical joint portion 63 provided along the rear periphery. The inner fabric portion 61 is joined to the inner fabric portion 53 of the main inflation portion 51 by the rear vertical joint portion 63. The outer fabric portion 62 has a rear vertical joint portion 64 provided along the rear periphery, and is joined to the outer fabric portion 54 of the main inflation portion 51 by the rear vertical joint portion 64.

The fabric portions 61, 62 of the partition 60 are joined to each other at a front vertical joint portion 65 at the front peripheries (refer to FIG. 10). The partition 60 bridges the fabric portions 53, 54 of the main inflation portion 51 by the above-described joining structure.

Space in the main inflation portion 51 that is rearward of the partition 60 constitutes the rear inflation chamber 56. The gas generator 40 is located at the rear end of the rear inflation chamber 56. The details will be discussed below. The rear inflation chamber 56 starts being supplied with inflation gas from the inflator 41 at timing earlier than that of the front inflation chamber 57 to be deployed and inflated beside the rear half of the thorax region PT and the lumbar region PP in the upper body of the occupant P.

Space in the main inflation portion 51 that is forward of the partition 60 forms the front inflation chamber 57. The front inflation chamber 57 is supplied with inflation gas via the rear inflation chamber 56 and the partition 60 and is deployed and inflated beside the front half of the thorax region PT and the shoulder region PS in the upper body of the occupant P.

The partition 60 has openings 66, which connect the rear inflation chamber 56 and the front inflation chamber 57 to each other. As shown in FIG. 7, the openings 66 of the present embodiment are formed by holes formed in each of the fabric portions 61, 62 of the partition 60. Since each fabric portion 61, 62 has a pair of holes, the partition 60 has four holes, or four openings 66.

One or more than two openings 66 may be formed in each of the fabric portions 61, 62. Alternatively, only one of the fabric portions 61, 62 may have openings 66.

<Inner Tube 70>

The inner tube 70 is arranged in the rear inflation chamber 56 to encompass most of the gas generator 40 except for the lower end. The part of the gas generator 40 that is encompassed by the inner tube 70 includes the gas outlet 43 of the inflator 41. The inner tube 70 has a function of regulating the flow of inflation gas from the gas outlet 43.

The inner tube 70 is formed by a single rectangular fabric piece made of the same material as the main inflation portion 51. The surface of the fabric piece may be coated with silicone resin.

The fabric piece in a spread state has a vertically extending folding line 71 at the center in the width direction of the fabric piece. The fabric piece is arranged with the folding line 71 matched with the folding line 52 of the main inflation portion 51 in a spread state. The fabric piece is joined to the main inflation portion 51 by the vertical joint portion 72, which is provided along the folding lines 71, 52. This determines the position of the inner tube 70 in relation to the main inflation portion 51.

The fabric piece is folded in half along the folding line 71 to be superposed on itself in the vehicle width direction. To distinguish the two superposed portions of the fabric piece, the part located on the inner side will be referred to as a fabric portion 73, and the part located on the outer side will be referred to as a fabric portion 74.

The fabric portions 73, 74, which are superposed on each other, are joined to each other at the upper lateral joint portion 75 provided at the upper edges. In contrast, the lower edges of the fabric portions 73, 74 superposed on each other are not joined to each other. Further, the fabric portions 73, 74, which are superposed on each other, are joined to each other by the front vertical joint portion 76 provided along the front edges. The front vertical joint portion 76 is not provided in front upper parts of the fabric portions 73, 74, so that the fabric portions 73, 74 are not joined to each other.

The above described joining procedure forms the inner tube 70, which has a closed upper end, an open lower end, and an open front upper part and extends substantially vertically as a whole. The front upper open part and the open lower end of the inner tube 70 constitute gas supply ports 77, 78 respectively. The gas supply ports 77, 78 supply, to the rear inflation chamber 56, inflation gas discharged to the inner tube 70 from the gas outlet 43 of the inflator 41.

The main inflation portion 51 and the inner tube 70, which are superposed on each other and each folded in half, each have a slit 81 at the rear end and the middle part in the vertical direction. The slits 81 extend in a direction orthogonal to the folding lines 52, 71 (see FIG. 7). The parts of the fabric, portions 53, 54 and the fabric portions 73, 74 that are below the slits 81 constitute an inward folding portion 62, which is folded into, or tucked into the remaining parts of the main inflation portion 51 and the inner tube 70 (see FIG. 9). The lower end of the inward folding portion 82 in the main inflation portion 51 is joined to the remaining parts of the fabric portions 53, 54 by part of the peripheral joint portion 55. When the inward folding portion 82 is formed, the slits 81 are opened to form an insertion port 83 for the gas generator 40. The fabric portions 53, 73 on the inner side respectively have bolt insertion holes 58, 84 above the slits 81 (the insertion port 83) to receive the two bolts 45 of the gas generator 40.

The gas generator 40 is arranged to extend substantially vertically, and most of the gas generator 40 except for the lower end is inserted, through the insertion port 83, into the rear end of the inner tube 70, which is the rear end of the rear inflation chamber 56 in the main inflation portion 51. The lower end of the gas generator 40 is exposed to the outside of the main inflation portion 51. The bolts 45 of the gas generator 40 are inserted into the bolt insertion holes 84, 58, so that the gas generator 40 is secured to and positioned relative to the inner tube 70 and the main inflation portion 51.

<Auxiliary inflation Portion 85>

As shown in FIGS. 4, 5, and 7, the auxiliary inflation portion 85 is formed by a single fabric piece made of the same material as the main inflation portion 51. The fabric piece has a folding line 86 at the center in the width direction and is folded in half along the folding line 86 to be superposed on itself in the vehicle width direction. The superposed parts are joined to each other to form the auxiliary inflation portion 85. To distinguish the two superposed portions of the auxiliary inflation portion 85, the part located on the outer side and adjacent to the fabric portion 53 of the main inflation portion 51 will be referred to as a fabric portion 88, and the part located on the inner side and not adjacent to the fabric portion 53 of the main inflation portion 51 will be referred to as a fabric portion 87.

The shape and the size of the fabric portions 87, 88 are determined such that, when the auxiliary inflation portion 85 is inflated, the fabric portions 87, 88 are located at the height equivalent to the height of the shoulder region PS of the occupant P and push the shoulder region PS inward.

In the present embodiment, the fabric piece is folded in half such that the folding line 86 is located at the rear end of the auxiliary inflation portion 85. However, the fabric piece may be folded in half such that the folding line 86 is located at another end of the auxiliary inflation portion 85. The auxiliary inflation portion 85 may also be formed of two fabric pieces divided along the folding line 86. Furthermore, the auxiliary inflation portion 85 may be formed of three or more fabric pieces.

Figure 11:
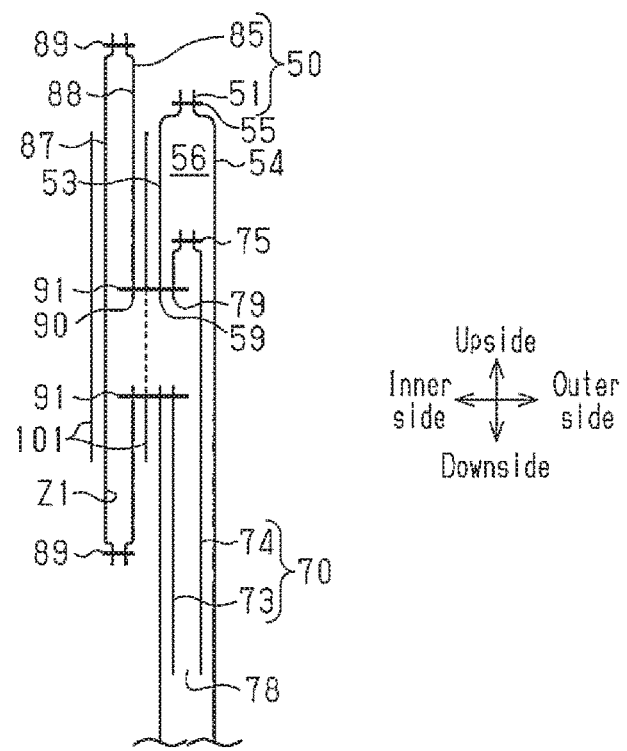
FIG. 11 is a cross-sectional view taken along line 11-11 in FIG. 4.

As shown in FIGS. 10 and 11, the fabric portions 87, 88 of the auxiliary inflation portion 85 are joined to each other at the peripheries except for the rear ends and the like. Specifically, the fabric portions 87, 88 are joined to each other by the peripheral joint portion 89, which is provided on the peripheries of the fabric portions 87, 88 except for the parts in the vicinity of the folding line 86. The "rear ends and the like" includes the rear lower parts of the fabric portions 87, 88, which are superposed on each other. The peripheral joint portion 89 is curved to detour the rear lower parts of the fabric portions 87, 88. The region of the auxiliary inflation portion 85 that is surrounded by the peripheral joint portion 89 constitutes an inflation region Z1, which is inflated by being supplied with inflation gas. The region in the auxiliary inflation portion 85 that is not surrounded by the peripheral joint portion 89, that is, the region about the inflation region Z1, constitutes a non-inflation region Z2, which is neither supplied with inflation gas nor inflated. The non-inflation region Z2 includes the rear lower parts.

In the inflation region Z1 of the auxiliary inflation portion 85, no equivalents of the partition 60 and the inner tube 70, which are arranged in the main inflation portion 51, are provided. Also, the inflator 41 is not arranged in the inflation region Z1 of the auxiliary inflation portion 85.

The auxiliary inflation portion 85 in an uninflated-spread state is arranged such that at least part thereof is superposed on the main inflation portion 51 in an uninflated-spread state. In the present embodiment, the most part of the auxiliary inflation portion 85 except for the upper end is superposed on the upper part of the main inflation portion 51 as shown in FIG. 5.

As shown in FIGS. 5, 6, and 7, the rear inflation chamber 56 of the main inflation portion 51, the inner tube 70, and the inflation region Z1 of the auxiliary inflation portion 85 respectively have communication ports 59, 79, 90 at positions that are in the vicinity of the gas outlet 43 of the inflator 41 and in which the inflation region Z1 is superposed on the main inflation portion 51. The communication ports 59, 79, 90 are each formed by a hole. As shown in FIGS. 10 and 11, the main inflation portion 51, the inner tube 70, and the auxiliary inflation portion 85 are connected with one another via the communication ports 59, 79, 90. The opening areas of the communication ports 59, 79, 90 are equal to or substantially equal to one another. In other words, the communication ports 59, 79, 90 have a common opening area.

In the present embodiment, the inflator 41 is arranged such that the gas outlet 43 is located at a position where the inflation zone Z1 of the auxiliary inflation portion 85 and the main inflation portion 51 are superposed on each other and between the main body 42 and the communication ports 59, 79, 90, so that the gas outlet 43 is located close to the communication ports 59, 79, 90.

As shown in FIGS. 8 and 10, the main inflation portion 51, the inner tube 70, and the auxiliary inflation portion 85 are joined to one another by only the loop-shaped joint portion 91 about the communication ports 59, 79, 90.

The fabric portions 87, 88 have bolt insertion holes 92 in rear lower parts in the non-inflation region Z2 to receive the two bolts 45 of the gas generator 40. The bolts 45 of the inflator 41, which are passed through the inner tube 70 and the main inflation portion 51, are received by the bolt insertion holes 92 of the fabric portions 87, 88 of the auxiliary inflation portion 85.

As shown in FIG. 12, the airbag module ABM, which includes the gas generator 40 and the airbag 50 as main components, is stored in the storage portion 32 in the outer side portion 18 of the seat back 14.

The bolts 45 extend from the gas generator 10 and are passed through the inner tube 70, the main inflation portion 51, and the auxiliary inflation portion 85, and are passed through the side frame portions 23 from the outer side. Nuts 46 are threaded to the bolts 45 from the inner side to fax the gas generator 40 to the side frame portion 23 together with the rear inflation chamber 56 of the main inflation portion 51, the inner tube 70, and the non-inflation region Z2 of the auxiliary inflation portion 85.

The gas generator 40 may be fixed to the side frame portion 23 using members other than the bolts 45 and the nuts 46.

FIG. 12 illustrates a cover 47 that is attached to the side frame portion 23 from the inner side to cover the bolts 45 and the nuts 46, so that the auxiliary inflation portion 85 will not be damaged by the bolts 45.

As shown in FIG. 12, the main inflation portion 51 in an uninflated-spread state is either roll-folded or accordion-folded to be compact in the front-rear direction and the vertical direction and arranged in the storage portion 32. The roll-folding refers to a folding method in which one end of the main inflation portion 51 is set as a center and the remaining portion is wrapped about the center. The accordion-folding refers to a folding method in which the main inflation portion 51 is repeatedly folded by a constant width while alternating the folding direction.

In contrast, part of the auxiliary inflation portion 85 that is on the inner side of the part that is fixed to the outer side frame portion 23 is spread in front of the pressure receiving plate 28 of the seat back 14 without being folded. More specifically, the auxiliary inflation portion 85 is fixed to the side frame portion 23 from the outer side. The auxiliary inflation portion 85 is routed to pass in front of the side frame portion 23 and to extend to the space on the inner side of the side frame portion 23. The auxiliary inflation portion 85 is then routed to pass between the cover 47 and the seat pad 30 to be arranged between the pressure receiving plate 28 and the seat pad 30 located in front of the pressure receiving plate 28. Between the pressure receiving plate 28 and the seat pad 30 in front of the pressure receiving plate 28, the fabric portion 88 of the auxiliary inflation portion 85 is located in front of the fabric portion 87. As described above, the main part of the auxiliary inflation portion 85 is stored in the side portion 18 on the front side of the pressure receiving plate 28, and part of the auxiliary inflation portion 85 is arranged in the middle portion 16 on the front side of the pressure receiving plate 28.

Further, as shown in FIG. 12, webbings 93 of a low extensibility material are provided between the covering sheets 31 and the seat pad 30 and wrapped about the side frame portion 23 on the outer side and the airbag module ABM. The webbings 93 are provided to promote deployment of the main inflation portion 51. That is, the webbings 93 are extended at an early stage of deployment and inflation of the main inflation portion 51, thereby restricting the main inflation portion 51 from being inflated in directions different from a predetermined deployment direction. Also, the webbings 93 restrain deformation of the seat pad 30 and extension of the covering sheets 31, thereby promoting breakage of the seat pad 30 at the breakable portion 35. In this manner, the webbings 93 assist the inflating main inflation portion 51 in breaking the outer side portion 18.

The webbings 93 are spaced apart upward or downward from the inflation area of the auxiliary inflation portion 85. With this arrangement, the webbings 93 are unlikely to contact the auxiliary inflation portion 85 or hinder the inflation of the auxiliary inflation portion 85. In other words, the webbings 93 are arranged at positions where the webbings 93 do not contact the auxiliary inflation portion 85 during inflation of the auxiliary inflation portion 85.

As shown in FIG. 1, the side airbag apparatus includes an impact sensor 95 and a controller 96 in addition to the above-described airbag module ABM. The impact sensor 95 is formed by an acceleration sensor and the like. The impact sensor 95 is provided on the side wall 11 of the vehicle 10 shown in FIG. 2 or the like to detect an impact applied to the side wall 11 from the side. The controller 96 controls operation of the inflator 41 based on a detection signal from the impact sensor 95.

Furthermore, the vehicle 10 is equipped with a seat belt apparatus for restraining the occupant P seated in the vehicle seat 12. However, illustration of the seat belt apparatus is omitted in FIG. 1 and other drawings.

The side airbag apparatus has the basic configuration described above. In addition to the above-described basic configuration, the present embodiment further includes a restriction portion, which restricts the auxiliary inflation portion 85, which is stored in the seat back 14 at a position forward of the pressure receiving plate 28, from being inflated toward a gap G1, which is between the rear end section in the outer side portion 18 of the seat back 14 and the rear end section in the middle portion 16 of the seat back 14. The gap G1 corresponds to a space between the pressure receiving plate 28 and a section including the rear pad portion 30a and the rear end of the side frame portion 23.

The restriction portion is constituted by an outer tension belt 101. Like the webbings 93, the outer tension belt 101 has an elongated shape and is made of a low extensibility material. The outer tension belt 101 has a width narrower than the vertical dimension of the auxiliary inflation portion 85. The outer tension belt 101 is arranged to surround a middle portion in the vertical direction of the auxiliary inflation portion 85 from the outside of the auxiliary inflation portion 85. The communication ports 59, 79, 90 and the loop-shaped joint portion 91 are located in the vertical region in which the outer tension belt 101 is located.

As shown in FIG. 12, the outer tension belt 101 has an attachment portion 101a at a first end and attached to the rear end of the outer side frame portion 23 at the attachment portion 101a. As shown in FIGS. 6 and 7, a second end 101b of the outer tension belt 101 is fixed to a section of the airbag 50 that is adjacent to the section fixed to the outer side frame portion 23, such that, when the auxiliary inflation portion 85 completes inflation, the outer tension belt 101 is tensioned. In the present embodiment, as the section that satisfies the conditions, a section is used that is between the inner fabric portion 53 of the main inflation portion 51 and the outer fabric portion 88 of the auxiliary inflation portion 85, and adjacent to and forward of the communication ports 59, 79, 90. The second end 101b of the outer tension belt 101 is not located at the communication ports 59, 79, 90. The second end 101b is located at the above-described section and is joined to the main inflation portion 51, the inner tube 70, and the auxiliary inflation portion 85 by part of the loop-shaped joint portion 91.

Operation and advantages of the side airbag apparatus according to the present embodiment, which is configured as described above, will now be described.

As shown in FIGS. 1 and 2, when the impact sensor 95 detects that an impact of a magnitude greater than or equal to a predetermined value has been applied to the side wall 11 due to a side collision or the like when the vehicle 10 is running, the controller 96, based on the detection signal, outputs an activation signal for activating the inflator 41 to the inflator 41. In response to the activation signal, the inflator 41 discharges inflation gas through the gas outlet 43. The discharged inflation gas is first supplied to the inner tube 70, which surrounds the gas outlet 43, as shown in FIG. 8. The inflation gas starts inflating part of the main inflation portion 51 that surrounds the inner tube 70.

The flow of the inflation gas supplied to the inner tube 70 is regulated by the inner tube 70. Such regulation of flow causes some of the inflation gas to flow through the gas supply port 77 in the front upper part of the inner tube 70 (see FIG. 10) and the gas supply port 78 at the lower end (see FIG. 11) and to be supplied to the rear inflation chamber 56 of the main inflation portion 51.

The supply of the inflation gas through the two gas supply ports 77, 78 increases the internal pressure of the rear inflation chamber 56, so that the rear inflation chamber 56 starts being inflated. The inflation of the rear inflation chamber 56 pulls the partition 60 toward the opposite sides in the vehicle width direction. The partition 60 in the tensioned state restricts the inflation of the rear inflation chamber 56 in the vehicle width direction (see FIGS. 2 and 3).

Also, some of the inflation gas supplied to the rear inflation chamber 56 flows out to the front inflation chamber 57 through the openings 66 of the partition 60. The inflow of the inflation gas causes the front inflation chamber 57 to start being inflated with a delay from the rear inflation chamber 56.

Figure 13:
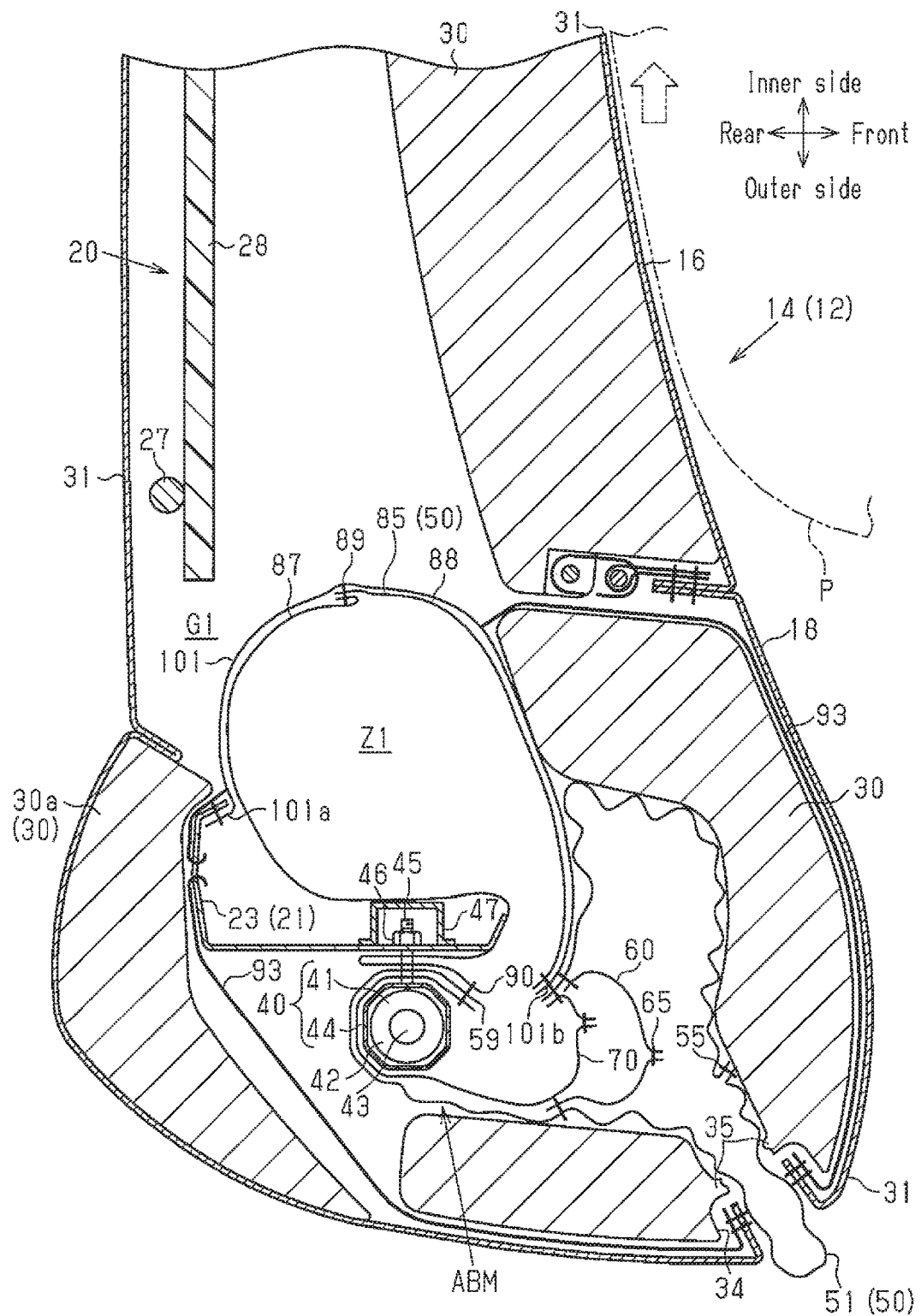
FIG. 13 is a partial cross-sectional plan view showing the internal structure of the seat back according to the embodiment, when the auxiliary inflation portion completes inflation.

The rear inflation chamber 56 and the front inflation chamber 57 are inflated while being unfolded in the reverse order of that when these were folded. The main inflation portion 51, which is deployed and inflated in the above-described manner, pushes the seat pad 30 of the seat back 14, so that the seat pad 30 is broken at the breakable portion 35 as shown in FIG. 13. The main inflation portion projected forward from the seat back 14 through the broken portion with part of the main inflation portion 51 remaining in the storage portion 32 (see FIGS. 1 and 2).

On the other hand, some of the inflation gas discharged into the inner tube 70 from the gas outlet 43 of the inflator 41 flows into the auxiliary inflation portion 85 from the communication port 79 of the inner tube 70 and through the communication port 59 of the main inflation portion 51 and the communication port 90 of the auxiliary inflation portion 85 in the order (see FIGS. 10 and 11). At this time, since the second end 101b of the outer tension belt 101 is not located at the communication ports 59, 79, 90, the second end 101b does not hinder the flow of the inflation gas. The inflation gas then starts inflating the auxiliary inflation portion 85 in the seat back 14 at a position in front of the pressure receiving plate 28 and toward the boundary between the middle portion 16 and the outer side portion 18.

At the inflation of the auxiliary inflation portion 85, the outer side frame portion 23, which has a high stiffness, functions as a pressure receiving portion to receive the pressure of the inflation gas diffused into the auxiliary inflation portion 85 as shown in FIG. 12. This produces reaction force acting toward the boundary of the seat back 14. The reaction force inflates the auxiliary inflation portion 85 forward and diagonally inward as shown in FIG. 13. The inflated auxiliary inflation portion 85 pushes part of the outer side portion 18 close to the middle portion 16 so that the part bulges toward the inner side and diagonally forward.

At this time, if the auxiliary inflation portion 85 were inflated rearward and entered the gap G1 between the pressure receiving plate 28 and the section including the rear pad portion 30a and the rear end of the side frame portion 23, such rearward inflation of the auxiliary inflation portion 85 would reduce the reaction force of the auxiliary inflation portion 85 that pushes the part of the seat back 14 forward of the auxiliary inflation portion 85 and inflates the part diagonally forward and inward.

However, in the present embodiment, as shown in FIG. 13, the restriction portion restrains the auxiliary inflation portion 85 from being inflated toward the gap G1. That is, the attachment portion 101 of the outer tension belt 101 is attached to the rear end of the side frame portion 23 and is restricted from moving by the side frame portion 23. The second end 101b of the outer tension belt 101, which is fixed to the section of the airbag 50 near the section fixed to the side frame portion 23, is restricted from moving by the side frame portion 23. In the outer tension belt 101, the middle portion between the attachment portion 101a and the second end 101b is allowed to move to follow the inflation of the auxiliary inflation portion 85. In addition, the second end 101b is fixed to the airbag 50 at a section where the outer tension belt 101 is tensioned when the auxiliary inflation portion 85 completes inflation. Thus, as the auxiliary inflation portion 85 is inflated, the outer tension belt 101 is pulled. When the auxiliary inflation portion 85 completes inflation, the outer tension belt 101 is tensioned and regulates the inflated shape of the auxiliary inflation portion 85 to be substantially circular in the horizontal cross section. The auxiliary inflation portion 85 is restrained from being inflated rearward toward the gap G1 and entering the gap G1.

The pressure of the inflation gas in the auxiliary inflation portion 85 is thus received and reaction force is efficiently generated.

If stored in a folded state, the auxiliary inflation portion 85 would be inflated while being unfolded. Some of the energy of the inflation gas would be spent for unfolding, which would hinder smooth inflation. In contrast, the auxiliary inflation portion 85 of the present embodiment is stored in a spread state and thus does not need to be unfolded. This allows for smooth inflation.

Since the auxiliary inflation portion 85 is inflated in the above-described manner, the middle portion 16 bulges inward and diagonally forward to push the back of the occupant P leaning against the seat back 14 inward and diagonally forward as shown in FIG. 13 before the main inflation portion 51 is deployed forward outside the seat back 14. The occupant P is moved inward as indicated by the long dashed double-short dashed lines in FIG. 2. The direction of the movement is away from the side wall 11. Further, since the auxiliary inflation portion 85 has a smaller volume than that of the main inflation portion 51, the auxiliary inflation portion 85 is completely inflated at an earlier time than the main inflation portion 51. Thus, prior to deployment of the main inflation portion 51 outside the seat back 14, the auxiliary inflation portion 85 properly pushes the occupant P inward. The above movement enlarges the space between the side wall 11 and the occupant P in the vehicle width direction.

In contrast, the main inflation portion 51, which has projected forward from the seat back 14, continues being inflating thereafter. That is, the main inflation portion 51 is deployed and inflated outside the seat back 14, more specifically, in the space between the side wall 11 and the upper body of the occupant P.

At this time, as described above, the space between the side wall 11 and the occupant P is enlarged in the vehicle width direction as the auxiliary inflation portion 85 moves the occupant P. Thus, compared to a case in which the auxiliary inflation portion 85 does not enlarge the space in this manner, the main inflation portion 51 is easily deployed and inflated between the occupant P and the side wall 11, which is bulging into the passenger compartment.

The main inflation portion 51, which is deployed and inflated in the above-described manner, restrains the occupant P. That is, the deployed and inflated main inflation portion 51 is located between the upper body of the occupant P and the side wall 11, which bulges into the passenger compartment. The main inflation portion 51 mitigates the impact from the side transmitted to the occupant P via the side wall 11, thereby protecting the occupant P from the impact.

In addition to the ones listed above, the present embodiment achieves the following advantages.

As shown in FIGS. 6 and 7, the outer tension belt 101 fixed to the airbag 50 (the main inflation portion 51 and the auxiliary inflation portion 85) at the second end 101b. Thus, the outer tension belt 101 is easy to handle when the side airbag apparatus is transported or installed in the seat back 14.

The communication ports 59, 79, 90 of the main inflation portion 51, the inner tube 70, and the auxiliary inflation portion 85 are mutually joined together by the loop-shaped joint portion 91 provided therearound. The second end 101b of the outer tension belt 101 is coupled to the main inflation portion 51, the inner tube 70, and the auxiliary inflation portion 85 by utilizing the loop-shaped joint portion 91. In this way, the loop-shaped joint portion 91 not only joins the main inflation portion 51, the inner tube 70, and the auxiliary inflation portion 85 together, but also joins the second end 101b of the outer tension belt 101 to the main inflation portion 51, the inner tube 70, and the auxiliary inflation portion 85. Therefore, unlike the case where the second end 101b of the outer tension belt 101 is coupled to a different portion from the above-described portion of the airbag 50, it is not necessary to provide an additional joint portion.

The above-described embodiment may be modified as follows.

<Regarding Main Inflation Portion 51>

At least one of the partition 60 and the inner tube 70 may be omitted from the main inflation portion 51.

The substantially entire main inflation portion 51 may be configured by the inflation region as in the above-illustrated embodiment, but may also partially include a non-inflation region, which is neither supplied with inflation gas nor inflated.

The main inflation portion 51 may be divided into three or more chambers arranged in the front-rear direction by two or more partitions 60.

The inner tube 70 may be modified as long as it is arranged to surround at least the gas outlet 43 of the inflator 41. Thus, unlike the above-illustrated embodiment, in which most of the inflator 41 is surrounded by the inner tube 70, only the gas outlet 43 may be surrounded by the inner tube 70.

<Regarding Auxiliary Inflation Portion 85>

The auxiliary inflation portion 85 may be folded like the main inflation portion 51 when arranged in the seat back 14. For example, the auxiliary inflation portion 85 may be folded along a folding line extending in the vertical direction at the center portion in the vehicle width direction. In this case, since the inflated shape of the auxiliary inflation portion 85 is regulated by the outer tension belt 101, the auxiliary inflation portion 85 can be properly inflated.

The auxiliary inflation portion 85 folded as described above may be entirely stored in the side portion 18.

The auxiliary inflation portion 85 in an uninflated-spread state may be entirely arranged to be superposed on the main inflation portion 51 in an uninflated-spread state.

Figure 14:
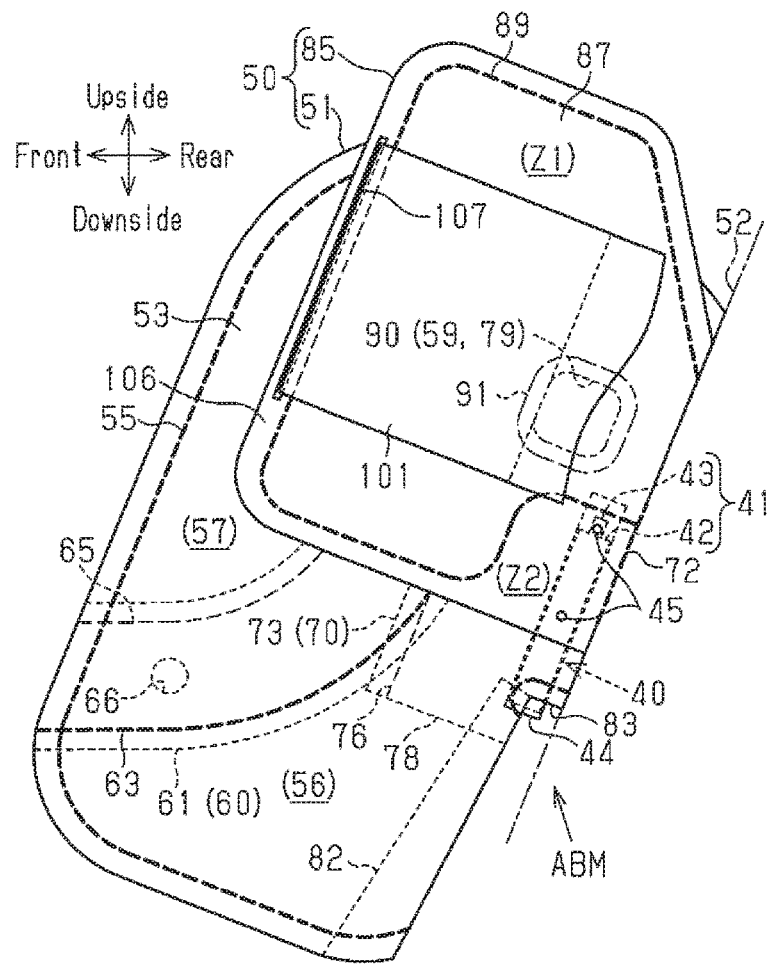
FIG. 14 is an explanatory partial side view corresponding to FIG. 5, illustrating the side airbag apparatus equipped with a displacement restraining portion for the outer tension belt.
Figure 15:
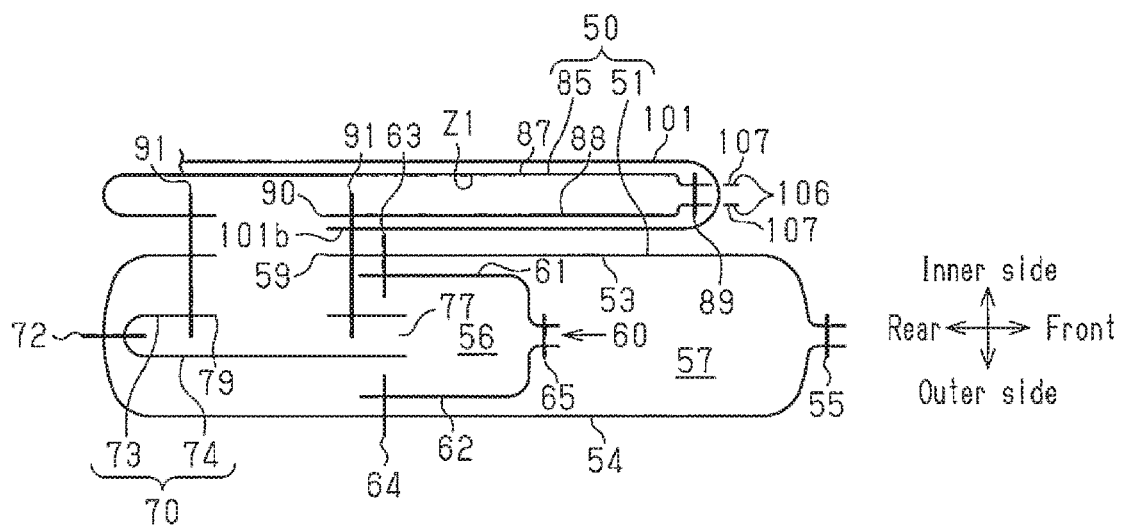
FIG. 15 is an explanatory cross-sectional view corresponding to FIG. 10, illustrating the side airbag apparatus equipped with the displacement restraining portion for the outer tension belt.

A displacement restraining portion may be provided to restrain the outer tension belt 101 from being displaced in the width direction. FIGS. 14 and 15 illustrate an example in which the auxiliary inflation portion 85 is provided with such a displacement restraining portion.

In this modification, the auxiliary inflation portion 85 has a slit 107 as the displacement restraining portion. The slit 107 is located in a region surrounding the peripheral joint portion 89 from outside (the region will hereafter be referred to as a sewing margin 106). The length of the slit 107 is set to be slightly longer than the width of the outer tension belt 101. Part of the outer tension belt 101 that bridges the fabric portion 87 and the fabric portion 88 is passed through the slit 107. According to this modification, the slit 107 restrains the outer tension belt 101 from moving (being displaced) in the width direction.

Therefore, it is possible to prevent the airbag module ABM from being attached to the outer side frame portion 23 with the outer tension belt 101 displaced from the proper position.

<Regarding Main Inflation Portion 51 and Auxiliary Inflation Portion 85>

The main inflation portion 51 and the auxiliary inflation portion 85 may be coupled to each other at a position away from the communication ports 59 and 90 in addition to the loop-shaped joint portion 91 around the communication ports 59 and 90.

<Regarding Restriction Portion>

The second end 101b of the outer tension belt 101 may be fixed to the airbag 50 at a section different from that in the above embodiment. That is, the second end 101b of the outer tension belt 101 may be fixed to the airbag 50 at a section different from the section forward of and adjacent to the communication ports 59, 79, 90. In this case, the second end 101b may be fixed to the airbag 50 by a loop-shaped joint portion such as the loop-shaped joint portion 91.

The second end 101b may be fixed only to the auxiliary inflation portion 85 or may be fixed only to the main inflation portion 51.

The second end 101b may be fixed to the airbag 50 by a joining means different from sewing, for example, adhesion.

The second end 101b may be coupled to the airbag 50 by the entire loop-shaped joint portion 91. In this case, at the second end 101b, a communication port is provided at a position corresponding to the communication ports 59, 79, 90.

Unlike the above-illustrated embodiment, in which the second end 101b is fixed to the airbag 50 in part in the width direction of the outer tension belt 101, the second end 101b may be fixed to the airbag 50 over the entire width.

The outer tension belt 101 may have a wider width in the vertical direction than that in the above-illustrated embodiment. For example, an outer tension belt 101 having the same width as the vertical dimension of the auxiliary inflation portion 85 may be used.

Figure 16:
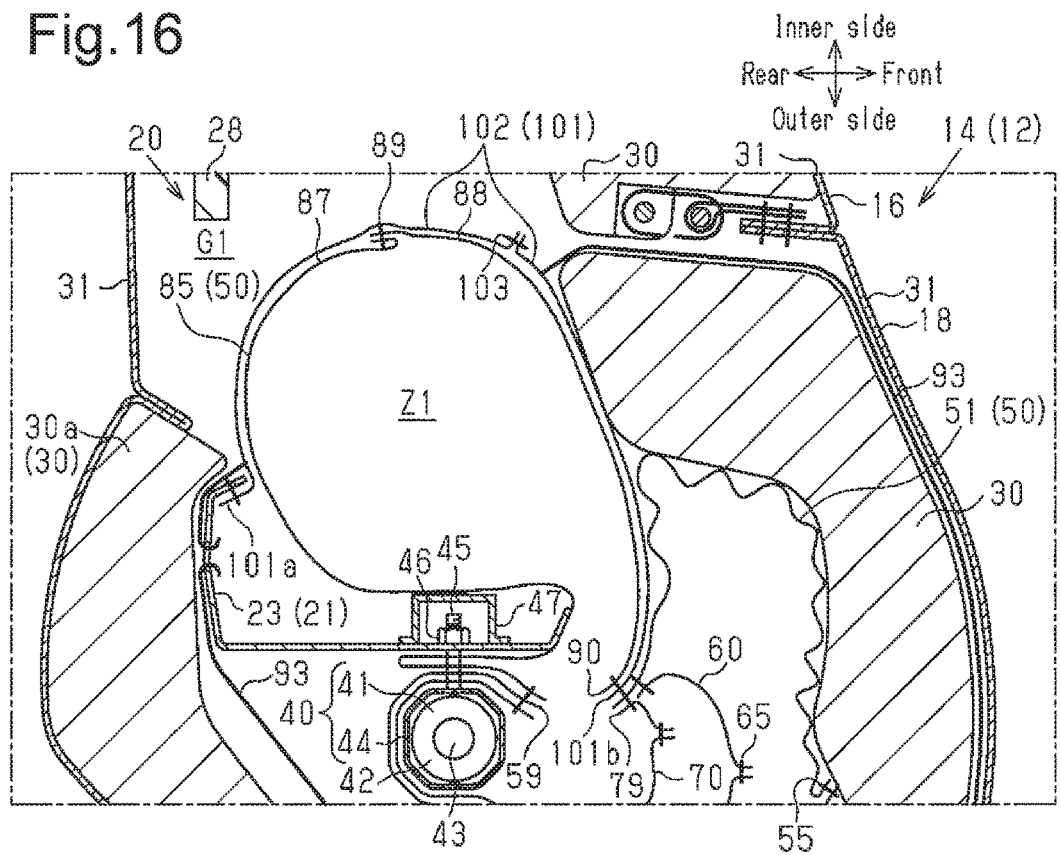
FIG. 16 is an explanatory partial cross-sectional plan view corresponding to FIG. 13, illustrating a side airbag apparatus equipped with an outer tension belt having a structure different from the above embodiment.

As shown in FIG. 16, the outer tension belt 101 surrounding the auxiliary inflation port on 85 may be constituted by a plurality of fabric pieces 102 arranged in the longitudinal direction. Adjacent fabric pieces 102 are joined by a joint portion 103. In this case, by changing the position of the joint portion 103 in the longitudinal direction of the outer tension belt 101, it is possible to change the inflated shape of the auxiliary inflation portion 85 that can be regulated by the outer tension belt 101.

Figure 17:
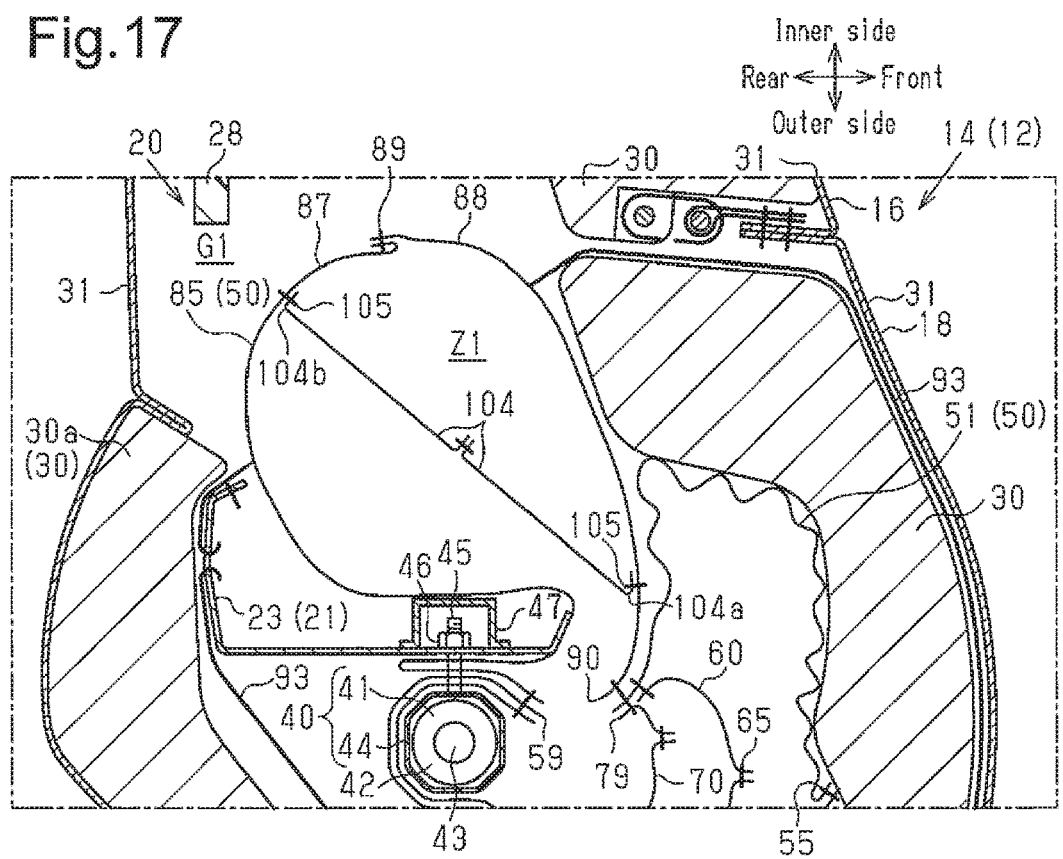
FIG. 17 is an explanatory partial cross-sectional plan view corresponding to FIG. 13, illustrating a side airbag apparatus equipped with an inner tension belt as a restriction portion.

As shown in FIG. 17, instead of the outer tension belt 101, an elongated inner tension belt 104 may be arranged in the auxiliary inflation portion 85 as a restriction portion. First and second ends 104a, 104b of the inner tension belt 104 are joined, by joint portions 105, to the sections that are opposed to each other when the auxiliary inflation portion 85 completes inflation. The first end 104a is preferably coupled to the auxiliary inflation portion 85 at a section close to the section at which auxiliary inflation portion 85 is fixed to the side frame portion 23. This modification restricts movement of the first end 104a of the inner tension belt 104 when the inner tension belt 104 is tensioned due to inflation of the auxiliary inflation portion 85, so that the auxiliary inflation portion 85 in the inflated state resists movement.

With this modification, when the auxiliary inflation portion 85 is supplied with inflation gas from the inflator 41 and inflated, the inner tension belt 104 bridging inner sides of the auxiliary inflation portion 85 is tensioned, accordingly. The inner tension belt 104 regulates the inflation shape of the auxiliary inflation portion 85, thereby restricting the auxiliary inflation portion 85 from being inflated toward the gap G1. Therefore, like the above-illustrated embodiment, this modification allows the auxiliary inflation portion 85 to be properly inflated to move the occupant P inward in a favorable manner.

<Other Modifications>

The above described side airbag apparatus does not necessarily need to be installed in the vehicle seat 12, in which the seat frame 20 includes the pressure receiving plate 28, but may be installed in any type of vehicle seat that includes a gap G1 defined between the rear end section in the outer side portion 18 of the seat back 14 and the rear end section in the middle portion 16 of the seat back 14.

The restriction portion (the outer tension belt 101, the inner tension belt 104) may be employed in an airbag apparatus having an auxiliary inflation portion 85 of a volume larger than that in the above illustrated embodiment or in a side airbag apparatus in which a gas generator 40 is arranged in the auxiliary inflation portion 85, but not in the main inflation portion 51.

The present invention may be applied to a side airbag apparatus of a vehicle in which the vehicle seat 12 is arranged such that the seat back 14 faces in a direction other than the forward direction, for example, sideways. In this case, when an impact is applied to a side of the vehicle seat 12 (in the front-rear direction of the vehicle), the side airbag apparatus protects the occupant P from the impact.

Vehicles to which the side airbag apparatus according to the present invention is applied include various industrial vehicles in addition to private cars.

The invention claimed is:

1. A side airbag apparatus comprising:
an inflator arranged in an outer side portion of a seat back of a vehicle seat, wherein the seat back includes a middle portion in a vehicle width direction, and the outer side portion is located on an outer side of the middle portion;
an airbag that includes
a main inflation portion stored in the outer side portion of the seat back, wherein the main inflation portion is configured to be inflated by inflation gas supplied from the inflator, project from the seat back, and be deployed forward in a space between a side wall of a vehicle and an occupant seated in a normal posture in the vehicle seat, and an auxiliary inflation portion, wherein at least a main part of the auxiliary inflation portion is stored in the outer side portion of the seat back, and the auxiliary inflation portion is configured to be inflated in the seat back by the inflation gas from the inflator, thereby pushing the occupant toward an inner side of the vehicle prior to the deployment of the main inflation portion outside the seat back, and a restriction portion that restricts the auxiliary inflation portion from being inflated toward a gap that is between a rear end section in the outer side portion of the seat back and a rear end section in the middle portion of the seat back, wherein a seat frame, which forms a framework of the seat back, is arranged in the seat back, part of the seat frame that is located in the outer side portion of the seat back is constituted by an outer side frame portion, a space between a rear end of the outer side frame portion and the rear end section in the middle portion of the seat back corresponds to the gap, the restriction portion is constituted by an outer tension belt, which surrounds the auxiliary inflation portion, and by being tensioned as the auxiliary inflation portion is inflated, the outer tension belt regulates an inflated shape of the auxiliary inflation portion, thereby restricting inflation of the auxiliary inflation portion toward the gap.

2. The side airbag apparatus according to claim 1, wherein the seat frame includes a pressure receiving plate arranged at the rear end section in the middle portion of the seat back, and an outer frame portion, which is separated from and surrounds the pressure receiving plate, the outer side frame portion is constituted by part of the outer frame portion, the auxiliary inflation portion is stored at a position forward of the pressure receiving plate, and a space between the rear end of the outer side frame portion and the pressure receiving plate corresponds to the gap.

3. The side airbag apparatus according to claim 1, wherein the airbag is fixed to the outer side frame portion, the outer tension belt has an elongated shape, a first end of the outer tension belt includes an attachment portion that is attached to the outer side frame portion, and a second end of the outer tension belt is fixed to a section of the airbag that is adjacent to a section fixed to the outer side frame portion, such that, when the auxiliary inflation portion completes inflation, the outer tension belt is tensioned.

4. The side airbag apparatus according to claim 3, wherein the inflator is arranged in one of the main inflation portion and the auxiliary inflation portion, the main inflation portion and the auxiliary inflation portion each have a communication port, the main inflation portion and the auxiliary inflation portion are connected to each other via the communication port of the main inflation portion and the communication port of the auxiliary inflation portion, the main inflation portion and the auxiliary inflation portion are joined to each other by a loop-shaped joint portion provided about the communication port of the main inflation portion and the communication port of the auxiliary inflation portion, and the second end of the outer tension belt is fixed to the main inflation portion and the auxiliary inflation portion by at least part of the loop-shaped joint portion.

* * * * *